Jan. 7, 1958     G. D. SIMS     2,819,451

ELECTROMAGNETIC-WAVE GENERATING SYSTEM

Filed July 11, 1952

*INVENTOR.*
GEOFFREY D. SIMS

BY *Laurence B. Dodds*

ATTORNEY though there may be effected on United States Patent Office 2,819,451
Patented Jan. 7, 1958

2,819,451

ELECTROMAGNETIC-WAVE GENERATING SYSTEM

Geoffrey D. Sims, Wembley, England, assignor to The General Electric Company, Limited, London, England Application July 11, 1952, Serial No. 298,411

Claims priority, application Great Britain July 12, 1951

6 Claims. (Cl. 333—21)

This invention relates to electromagnetic-wave generators and, particularly, to wave guides of circular cross-section for generating $TE_{01}$ electromagnetic waves from $TM_{11}$ electromagnetic waves.

A wave guide may be essentially a hollow conductor having internal dimensions critically related to the wave length of an electromagnetic wave to be propagated thereby. If the wave guide has a uniform interior with no discontinuities, an electromagnetic wave of the proper wave length once started on its way down the interior of the wave guide will continue traveling therealong and will follow the guide whether the latter is linear or contains gradual bends along its length. The propagation of wave-signal energy in a straight wave guide having no discontinuities is relatively free of reflections and this is approximately true for any gradual bends occurring therein. However, sharp bends in the wave guide have previously been considered to be highly undesirable since they usually form a severe discontinuity with consequent distortion of the electromagnetic wave front and consequent appreciable reflection of wave-signal energy. As will become more apparent hereinafter, when employing wave guides for wave translating it is frequently desirable to provide sharp bends therein, but their attendant disadvantages have heretofore greatly restricted and minimized their use placing an undue limitation on the usefulness of wave guides in practice.

Generally, two types of electromagnetic waves may be translated along conventional wave guides. These waves are designated TE waves in which the electric vector is transverse the wave guide and TM waves in which the magnetic vector is transverse the wave guide. Theoretically, each wave guide will permit an infinite number of transmission modes of the TE and TM waves to be translated therealong. Besides the above-mentioned general electric and magnetic characteristics, each mode is distinguished by a transverse field pattern consistent with the structure of the wave guide. In wave guides having circular cross-sections, as well as in other wave guides, the various TE and TM modes are designated by a double subscript $TE_{mn}$, $TM_{mn}$ where $m$ and $n$ are integers appearing in the mathematical functions describing transverse field patterns. To obtain reasonably efficient wave transmission along a wave guide of circular cross-section, it is desirable to translate a wave in the $TE_{01}$ mode since such can be translated along such a wave guide with a minimum of attenuation if a sufficiently high-frequency wave is employed. The frequency of the wave should, in general, be high relative to the critical or cutoff frequency of the wave guide. However, when utilizing waves of such high frequency, transmission in a number of modes other than the desired $TE_{01}$ mode is possible, causing the generation of the desired $TE_{01}$ waves to be difficult without at the same time generating waves in other modes which result in a decrease of power in the desired $TE_{01}$ mode.

It is an object of the present invention, therefore, to provide an electromagnetic-wave generating system for developing $TE_{01}$ waves from $TM_{11}$ waves which does not have the limitations of prior wave-developing apparatus.

It is still another object of the present invention to provide an electromagnetic-wave generating system for developing $TE_{01}$ waves from $TM_{11}$ waves in wave guides having sharp bends therein.

It is an additional object of the present invention to provide an electromagnetic-wave generating system for developing $TE_{01}$ waves from $TM_{11}$ waves with relatively minor loss of power caused by developing waves having unwanted modes.

It is also an object of the present invention to provide an electromagnetic-wave generating system for developing $TE_{01}$ waves from $TM_{11}$ waves in wave guides of circular cross-section.

It is still an additional object of the present invention to provide an electromagnetic-wave generating system for generating $TE_{01}$ waves from $TM_{11}$ waves.

In accordance with the present invention, an electromagnetic-wave generating system comprises a generator of a $TM_{11}$ electromagnetic wave and a first wave guide of circular cross-section coupled to this generator for translating the $TM_{11}$ wave with the maximum electrical field intensity thereof in a predetermined plane. The apparatus also includes an arcuate wave guide of circular cross-section coupled to the first wave guide and having a longitudinal axis in a plane perpendicular to the predetermined plane, whereby the arcuate guide generates a $TE_{01}$ wave substantially free from other modes from a $TM_{11}$ wave.

For a better understanding of the present invention, together with other and further objects thereof, reference is had to the following description taken in connection with the accompanying drawing, and its scope will be pointed out in the appended claims.

The invention will be further described with reference to Figs. 1, 2, and 3 of the accompanying diagrammatical drawing which illustrate by way of example one embodiment of the invention.

Figure 1:
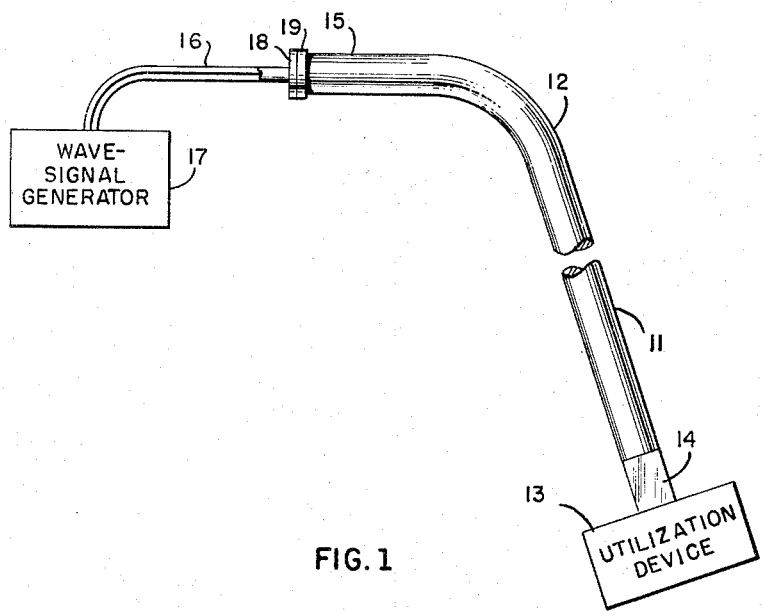
Fig. 1 represents diagrammatically a top or plan view of an electromagnetic-wave generating system in accordance with the present invention.

Referring now to Fig. 1, there is represented an electromagnetic-wave generating system which comprises a generator of a $TM_{11}$ electromagnetic wave, for example, a wave-signal generator 17 which may be of a conventional type such as a magnetron or other velocity-modulation type of oscillator having its output circuit coupled to a coaxial transmission line 16.

Figures 2, 3:
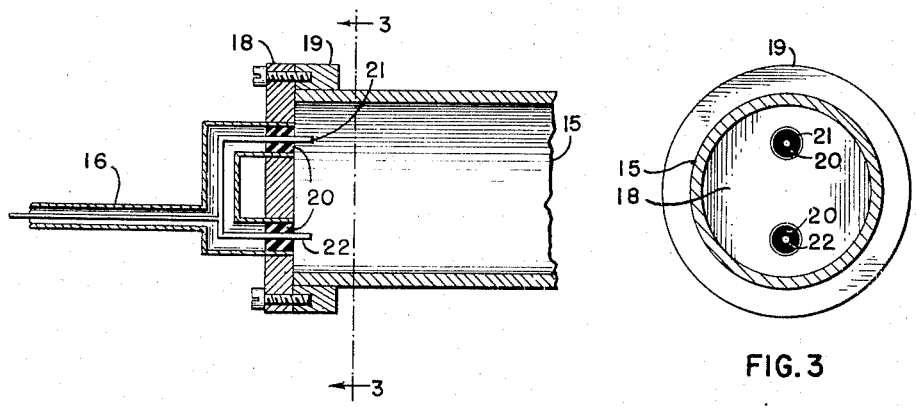
Fig. 2 is a longitudinal sectional view of a portion of the generating system of Fig. 1.
Fig. 3 is a sectional view on the line 3—3 of Fig. 2.

The electromagnetic-wave generating system also comprises a first wave guide 15 of circular cross-section coupled to the above-mentioned generator, specifically, to the terminals of the coaxial line 16 remote from the unit 17 through a coupling member 18. As represented in more detail in Fig. 2, which represents a longitudinal side section at right angles to the top view of Fig. 1, and also as represented in Fig. 3, the wave guide 15 is terminated at one end by a circular end member, specifically, a metal plate 18 fastened by screws to a collar 19 mounted on the end of the wave guide 15. Two thin metallic rods, specifically, probes 21 and 22 are inserted through insulating bushings 20, 20 in the plate 18. The longitudinal axes of the probes 21 and 22 extend parallel to the longitudinal axis of the wave guide 15 and these probes are disposed on a diameter of the guide but on opposite sides of the longitudinal axis thereof, each probe being positioned at a radial distance from that axis corresponding to the first maximum of the Bessel function $J_1(kr)$, where $r$ is the radial distance from the longitudinal axis and $k$ is a constant determined by the relationship $3.83/a$, where $a$ is the radius of the wave guide 15. A more detailed explanation of the above-mentioned Bessel function is presented in Section 10–13 of the "Electrical Engineers' Handbook," by Pender and McIlwain, 4th edition. The diameter on which the probes 21 and 22 are positioned is perpendicular to the plan view of the guide as presented in Fig. 1, in other words, being on a diameter extending from top to bottom of the wave guide 15. The probes 21 and 22 are each connected to the inner conductor of the coaxial line 16, the radial lengths from the inner conductor to individual ones of the probes 21 and 22 differing by a half wave length so that these probes are arranged to be excited in antiphase and, thus, to develop $TM_{11}$ waves in the wave guide 15. The positioning of the probes along a diameter extending from the top to bottom of the wave guide causes the $TM_{11}$ wave developed in the wave guide 15 to have the maximum electrical field thereof in a predetermined plane, specifically, in a plane including the diameter on which the probes 21 and 22 are mounted and passing through the longitudinal axis of the wave guide 15 from the top to bottom thereof.

The electromagnetic-wave generating system also comprises an arcuate wave guide 12 of circular cross-section joined or coupled to the first wave guide 15 and having a longitudinal axis in a plane perpendicular to the above-mentioned predetermined plane of the maximum electrical field intensity of the $TM_{11}$ wave. Specifically, the longitudinal axis of the wave guide is in a plane at right angles to the plane of the probes 21 and 22 of Fig. 2. The arcuate wave guide 12 preferably is in the form of a circular arc though other forms, for example, elliptical arcs may be employed. Considering more specifically the angle of the arc of the wave guide 12, if the free-space wave length of the desired $TE_{01}$ wave is $\lambda$ and the radius of the circular cross-section of the wave guide 12 is $a$ as considered previously herein, then preferably the angle embraced by the curved portion of the wave guide 12 should be approximately $155\lambda/2a$ degrees. In general, the radius of curvature of the arc of the wave guide 12 is not critical as long as it is large compared with the free-space wave length of the electromagnetic wave being translated therealong and may, for example, be approximately one foot when an electromagnetic wave having a free-space wave length of 3 centimeters is being translated therealong. The theory of the curvature of the arc of the wave guide 12 with respect to the waves translated therealong will be considered in more detail hereinafter.

The electromagnetic-wave generating system may include an additional wave guide 11 which is substantially straight and is coupled between the curved wave guide 12 and a utilization device 13. The wave guide 11 is suitably dimensioned for the translation of the $TE_{01}$ wave developed in the guide 12 to a distant point. The utilization device 13 may be, for example, an antenna for radiating electromagnetic waves or a repeater station amplifier. In some types of installations, the device 13 may be coupled to the guide 11 through a short length of guide 14 which has other than a circular cross-section, for example, which may have a rectangular cross-section into which the circular wave guide 12 is gradually transformed.

It is to be understood that, though the guides 11, 12, 14, and 15 have been considered as separate guides, as represented in Fig. 1, these guides will usually be formed into one integral wave guide coupled between the units 13 and 17.

*Explanation of operation of electromagnetic-wave generating system*

Considering now the operation of the electromagnetic-wave generating system of Figs. 1–3, inclusive, it will be helpful initially to discuss in more detail the relationships of waves having $TM_{11}$ and $TE_{01}$ modes and the theory upon which the curvature of the wave guide 12 is founded.

It is known in the wave-guide art that arcuate wave guides may cause coupling between the modes of waves being translated therealong. Considering the curved wave guide 12 of Fig. 1, if a wave is to be translated therealong having a wave front which is continuously at right angles to the cylindrical cross-section axis of the wave guide and this relationship is to be maintained between the wave front and the wave guide, the propagated wave in being translated around the curve is shortened at the inside of the bend and lengthened at the outside of the bend. If compression of the wave is regarded as positive, and expansion thereof as negative, deformation of the wave as it is translated along the curved wave guide 12, the distortion of the wave shape is proportional to the curvature of the wave guide multiplied by the cosine of the azimuth angle, where the latter angle is the one which the maximum electrical field intensity of the propagated wave forms with a plane at right angles to the plane passing through the longitudinal axis of the wave guide 12. The cosine of this angle is known as the azimuth index. Since, as has been described previously, this angle is zero for the $TM_{11}$ wave developed in the guide 15 due to the positioning of the probes 21, 22 with respect to the plane of the arc of the guide 12, the distortion of the wave shape becomes proportional solely to the curvature of the wave guide 12. The cosine of the zero angle causes the $TM_{11}$ wave to have an azimuth index of 1.

Considering more specifically how a wave of one mode may be developed from a wave of another mode by means of a curved wave guide, it is accepted theory that the coupling between modes or the conversion from one mode to another is proportional to the distortion of a wave front as just considered. Reasoning based upon this theory and on basic equations for defining all modes of wave propagation in a wave guide of circular cross-section leads to the conclusion that the bending of a wave guide causes coupling mainly between those modes which differ by $\pm 1$ in azimuth index. Since, as has previously been stated herein, the $TM_{11}$ mode has an azimuth index of 1, it follows that it can be converted by a curved wave guide into a $TE_{01}$ wave having an azimuth index of zero. The sharpness of the angle formed by the guide is related to the mode coupling and it has been experimentally determined that a suitable angle of curvature is approximately $155\lambda/2a$ degrees, as previously discussed herein, to convert a $TM_{11}$ mode to a $TE_{01}$ mode.

Considering now the details of operation of the electromagnetic-wave generating system of Figs. 1–3, inclusive, a wave signal of suitable frequency is developed in the generator 17 and translated by means of the coaxial line 16 to the guide 15. The positioning and spacing of the probes 21 and 22 within the confines of the wave guide 15 cause a $TM_{11}$ wave to be developed therein. This wave has the electrical field intensity thereof parallel to the line through the probes 21 and 22 and, thus, at right angles to the plane of the longitudinal axis of the curved wave guide 12. The details of generating a $TM_{11}$ wave are considered in more detail in that section of the "Electrical Engineers' Handbook," Pender and McIlwain, previously referred to herein. The translation of the $TM_{11}$ wave along the curved wave guide 12 effects distortion of the wave front thereof as previously discussed herein, and effectively generates the $TE_{01}$ wave from the $TM_{11}$ wave. The $TE_{01}$ wave generated in this manner being relatively free of interfering waves of other modes is translated along the straight wave guide 11 and the wave-guide section 14 with a minimum of attenuation for utilization in the device 13.

While applicant does not intend to be limited to any specific dimensions in the embodiment of the invention described herein, it has been found that for generating and transmitting an electromagnetic wave in the $TE_{01}$ mode, whose free-space wave length is 3 centimeters, the wave length within the wave guides 11, 12, 14 and 15 is 3.8 centimeters and the angle of curvature of the guide 12 is 78°. The radius of curvature of the center line of the guide 12 is approximately one foot under these conditions.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electromagnetic-wave generating system comprising: a generator of an electromagnetic wave; a first wave guide of circular cross-section having a pair of metallic probes mounted along a line at one end thereof and coupled to said generator so as to launch a $TM_{11}$ wave with the maximum electrical field intensity thereof in a predetermined plane including said line; an arcuate wave guide of circular cross-section coupled to said first wave guide and having a longitudinal axis in a plane perpendicular to said predetermined plane, the angle embraced by the arc of curvature of said arcuate guide being proportioned so that said arcuate guide generates a $TE_{01}$ wave substantially free from other modes from a $TM_{11}$ wave; and a $TE_{01}$ mode wave-guide transmission system connected to the output end of the arcuate guide for translating the $TE_{01}$ wave to a $TE_{01}$ mode utilization device.

2. An electromagnetic-wave generating system comprising: a generator of an electromagnetic wave; a first wave guide of circular cross-section having a circular end member and a pair of metallic probes spaced along a diameter of said member, said probes being coupled to said generator so as to launch a $TM_{11}$ wave with the maximum electrical field intensity thereof in a predetermined plane; an arcuate wave guide of circular cross-section coupled to said first wave guide and having a longitudinal axis in a plane perpendicular to said predetermined plane, the angle embraced by the arc of curvature of said arcuate guide being proportioned so that said arcuate guide generates a $TE_{01}$ wave substantially free from other modes from a $TM_{11}$ wave; and a $TE_{01}$ mode wave-guide transmission system connected to the output end of the arcuate guide for translating the $TE_{01}$ wave to a $TE_{01}$ mode utilization device.

3. An electromagnetic-wave generating system comprising: a generator of an electromagnetic wave; a first wave guide of circular cross-section having a circular end member and a pair of metallic probes spaced along a diameter of said member, said probes being coupled to said generator so as to launch a $TM_{11}$ wave with the maximum electrical field intensity thereof in a predetermined plane including said diameter; an arcuate wave guide of circular cross-section coupled to said first wave guide and having a longitudinal axis in a plane perpendicular to said predetermined plane, the angle embraced by the arc of curvature of said arcuate guide being proportioned so that said arcuate guide generates a $TE_{01}$ wave substantially free from other modes from a $TM_{11}$ wave; and a $TE_{01}$ mode wave-guide transmission system connected to the output end of the arcuate guide for translating the $TE_{01}$ wave to a $TE_{01}$ mode utilization device.

4. An electromagnetic-wave generating system comprising: a generator of an electromagnetic wave; a first wave guide of circular cross-section having a circular end member and a pair of rods spaced along a diameter of said member and having longitudinal axes substantially parallel to the longitudinal axis of said first wave guide, said rods being coupled to said generator so as to launch a $TM_{11}$ wave with the maximum electrical field intensity thereof in a predetermined plane including said diameter; an arcuate wave guide of circular cross-section coupled to said first wave guide and having a longitudinal axis in a plane perpendicular to said predetermined plane, the angle embraced by the arc of curvature of said arcuate guide being proportioned so that said arcuate guide generates a $TE_{01}$ wave substantially free from other modes from a $TM_{11}$ wave; and a $TE_{01}$ mode wave-guide transmission system connected to the output end of the arcuate guide for translating the $TE_{01}$ wave to a $TE_{01}$ mode utilization device.

5. An electromagnetic-wave generating system comprising: a generator of an electromagnetic wave; a first wave guide of circular cross-section having a circular end member and a pair of rods spaced along a diameter of said member and having longitudinal axes substantially parallel to the longitudinal axis of said first wave guide, said rods being positioned on opposite sides of the center of said end member at radial distances therefrom substantially corresponding to the first maximum of the Bessel function $J_1(kr)$ where $r$ is the radial distance from the center of said end piece and $k$ is a constant determined from $3.83/a$ where $a$ is the radius of the circular cross-section of said first wave guide, said rods being coupled to said generator for antiphase excitation by said generator, whereby said rods in combination with said first wave guide launch a $TM_{11}$ wave with the maximum electrical field intensity thereof in a predetermined plane including said diameter; an arcuate wave guide of circular cross-section coupled to said first wave guide and having a longitudinal axis in a plane perpendicular to said predetermined plane, the angle embraced by the arc of curvature of said arcuate guide being proportioned so that said arcuate guide generates a $TE_{01}$ wave substantially free from other modes from a $TM_{11}$ wave; and a $TE_{01}$ mode wave-guide transmission system connected to the output end of the arcuate guide for translating the $TE_{01}$ wave to a $TE_{01}$ mode utilization device.

6. An electromagnetic-wave generating system comprising: a generator of an electromagnetic wave; a first wave guide of circular cross-section having a circular end member and a pair of rods spaced along a diameter of said member and having longitudinal axes substantially parallel to the longitudinal axis of said first wave guide, said rods being positioned on opposite sides of the center of said end member at radial distances therefrom substantially corresponding to the first maximum of the Bessel function $J_1(kr)$, where $r$ is the radial distance from the center of said end piece and $k$ is a constant determined from $3.83/a$ where $a$ is the radius of the circular cross-section of said first wave guide, said rods being coupled to said generator for antiphase excitation by said generator, whereby said rods in combination with said first wave guide launch a $TM_{11}$ wave with the maximum electrical field intensity thereof in a predetermined plane including said diameter; an arcuate wave guide of circular cross-section coupled to said first wave guide and having a longitudinal axis in a plane perpendicular to said predetermined plane and the arc of which embraces an angle of substantially $155\lambda/2a$ degrees where $\lambda$ is the free-space wave length of said $TM_{11}$ wave and $a$ is the radius of said last-mentioned circular cross-section, whereby said arcuate guide generates a $TE_{01}$ wave substantially free from other modes from a $TM_{11}$ wave; and a $TE_{01}$ mode wave-guide transmission system connected to the output end of the arcuate guide for translating the $TE_{01}$ wave to a $TE_{01}$ mode utilization device.

References Cited in the file of this patent

UNITED STATES PATENTS

| | | |
|---|---|---|
| 2,129,712 | Southworth | Sept. 13, 1938 |
| 2,512,468 | Percival | June 20, 1950 |
| 2,586,754 | Wild | Feb. 19, 1952 |
| 2,612,559 | Jouguet | Sept. 30, 1952 |
| 2,632,804 | Jouguet | Mar. 24, 1953 |
| 2,649,578 | Albersheim | Aug. 18, 1953 |
| 2,691,766 | Clapp | Oct. 12, 1954 |